US010611085B1

(12) United States Patent
Janson

(10) Patent No.: US 10,611,085 B1
(45) Date of Patent: *Apr. 7, 2020

(54) APPARATUS AND METHOD FOR RECYCLING MATERIAL INTO AN OBJECT USING AT LEAST ONE OF AN ADDITIVE AND SUBTRACTIVE PROCESS, POWERED BY RENEWABLE, NON-RENEWABLE, OR INTERNAL ENERGY DEVICES, AND CONTROLLED REMOTELY BY ARTIFICIAL INTELLIGENCE, VOICE COMMAND, AND WIRELESS NETWORK CONTROLLERS

(71) Applicant: Frederick Christopher Janson, Rocklin, CA (US)

(72) Inventor: Frederick Christopher Janson, Rocklin, CA (US)

(73) Assignee: Frederick Christopher Janson, Rocklin, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/793,832

(22) Filed: Oct. 25, 2017

Related U.S. Application Data

(63) Continuation-in-part of application No. 14/960,190, filed on Dec. 4, 2015, now Pat. No. 9,902,115.

(60) Provisional application No. 62/412,697, filed on Oct. 25, 2016, provisional application No. 62/087,350, filed on Dec. 4, 2014.

(51) Int. Cl.
*B29C 64/357* (2017.01)
*B33Y 40/00* (2020.01)
*B08B 3/04* (2006.01)
*B29C 64/106* (2017.01)
*B29C 64/20* (2017.01)
*B33Y 10/00* (2015.01)
*B33Y 30/00* (2015.01)
*B33Y 50/02* (2015.01)
*B29C 64/35* (2017.01)
*B29C 64/393* (2017.01)

(52) U.S. Cl.
CPC .............. *B29C 64/357* (2017.08); *B08B 3/04* (2013.01); *B29C 64/106* (2017.08); *B29C 64/20* (2017.08); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
USPC ......................................... 425/217; 264/37.1
See application file for complete search history.

(56) References Cited

U.S. PATENT DOCUMENTS

| 9,902,115 B1* | 2/2018 | Janson | B29C 64/00 |
|---|---|---|---|
| 2006/0214335 A1* | 9/2006 | Cox | B01F 3/188 |
| | | | 264/497 |
| 2016/0129528 A1* | 5/2016 | Hyatt | B23K 26/342 |
| | | | 219/76.12 |
| 2016/0271875 A1* | 9/2016 | Brown, Jr. | B29C 64/386 |
| 2016/0320123 A1* | 11/2016 | Fromm | B24B 31/06 |

* cited by examiner

*Primary Examiner* — Nina Bhat

(57) ABSTRACT

An apparatus and method for recycling material into an object using at least one of an additive and subtractive process, powered by renewable, non-renewable, or internal energy devices, and including a grinder module, washing module, tool exchange and storage, and imaging devices, and controlled remotely by artificial intelligence, voice command, and network controllers is provided.

16 Claims, 9 Drawing Sheets

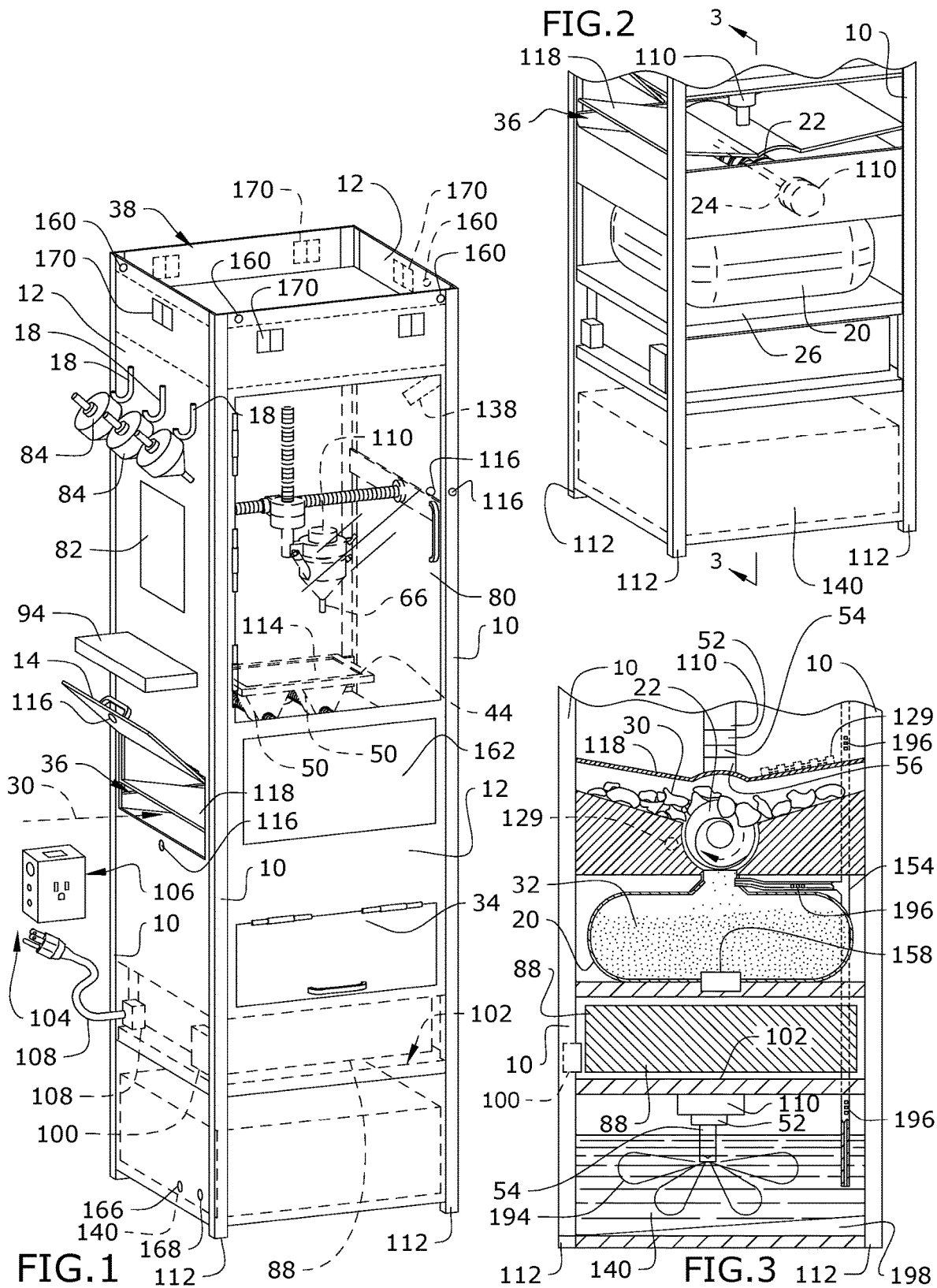

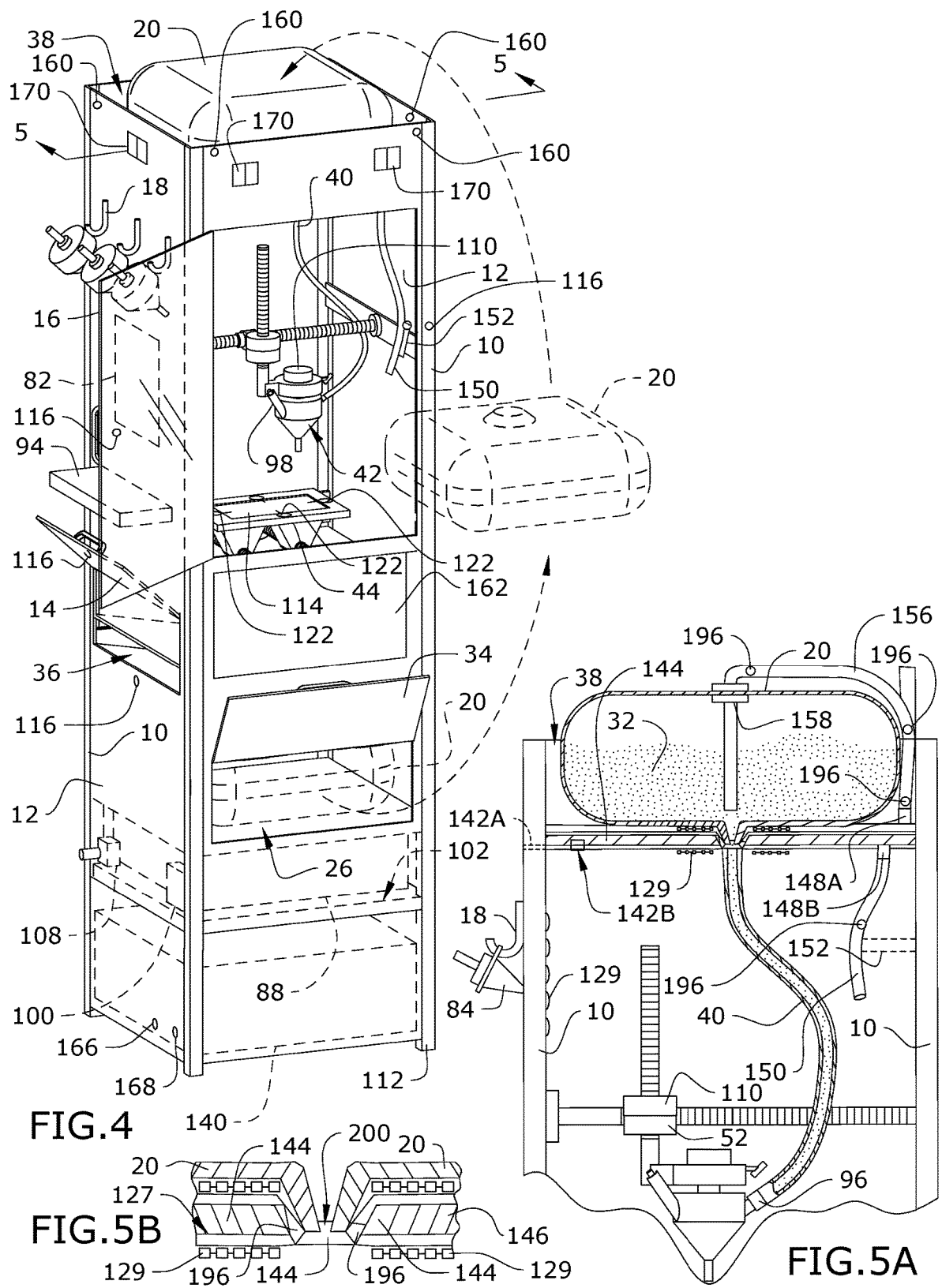

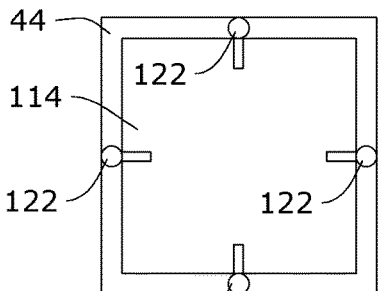
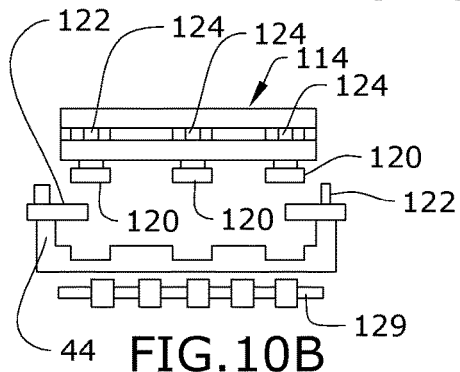
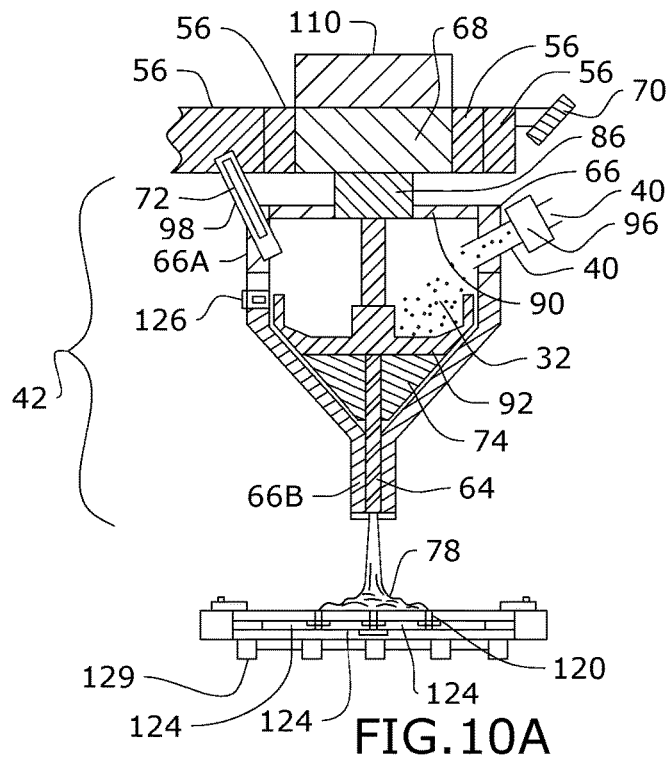
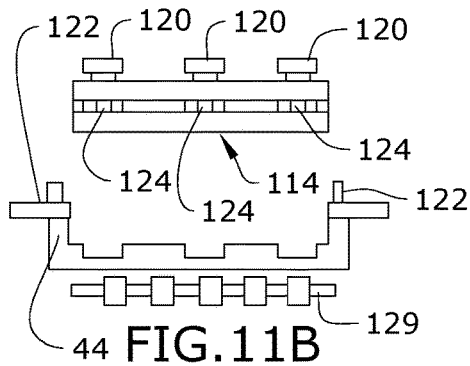
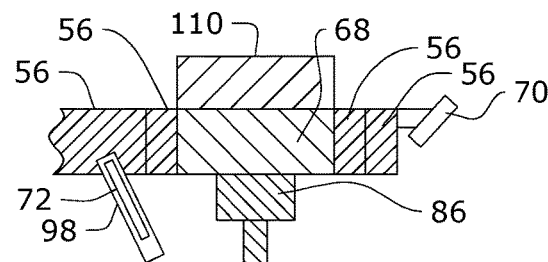
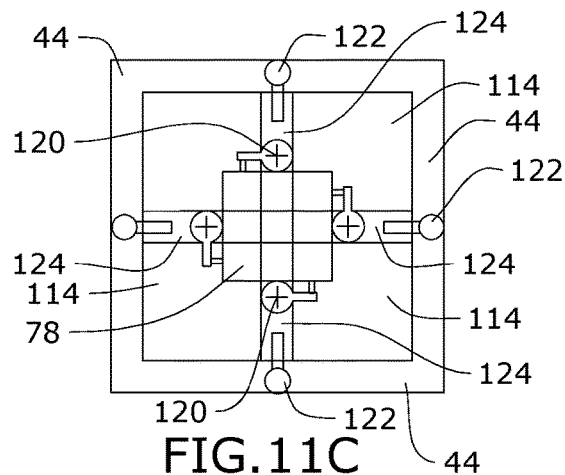
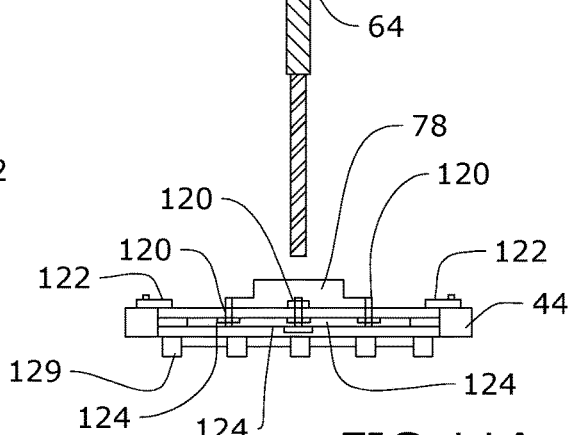

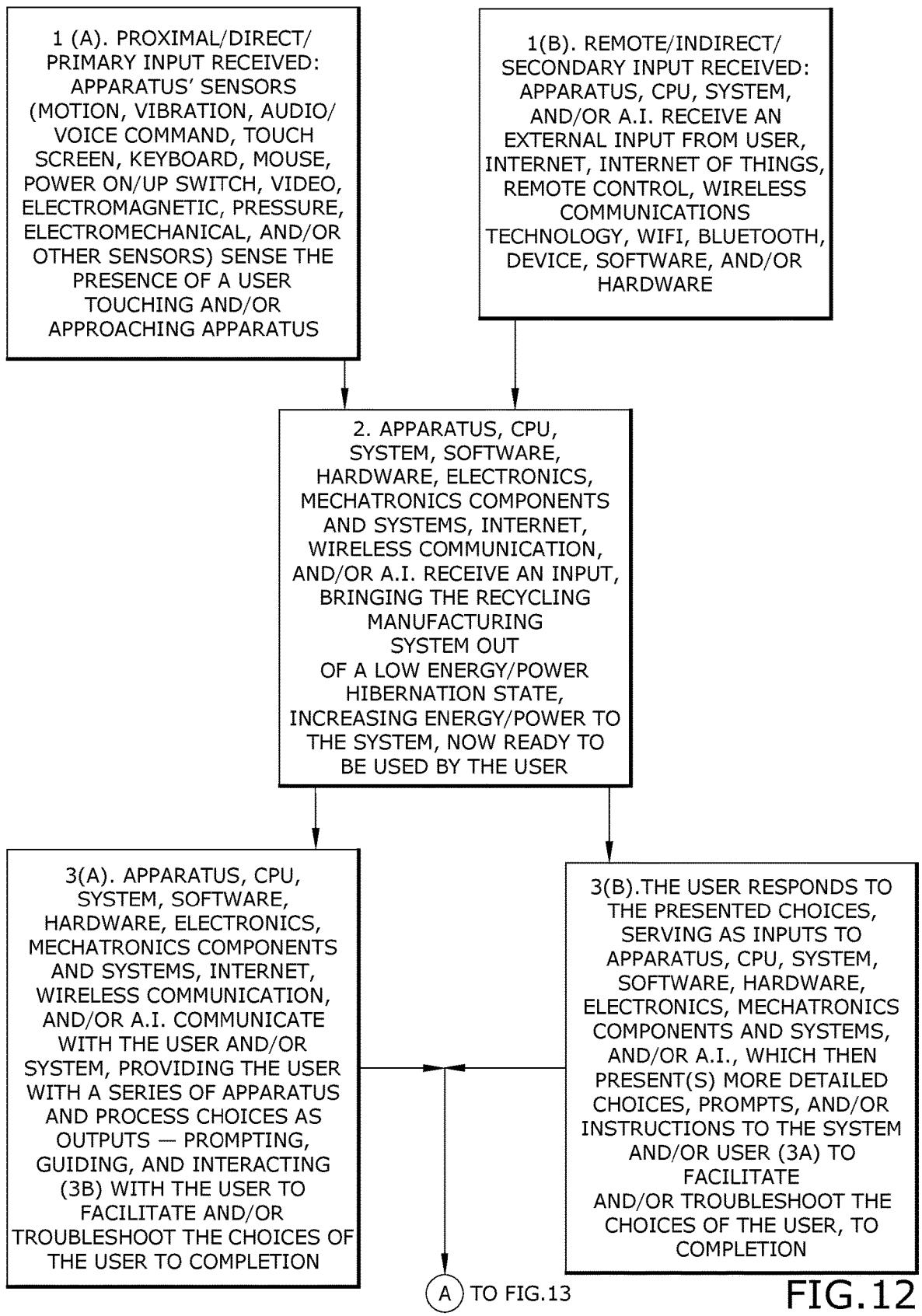

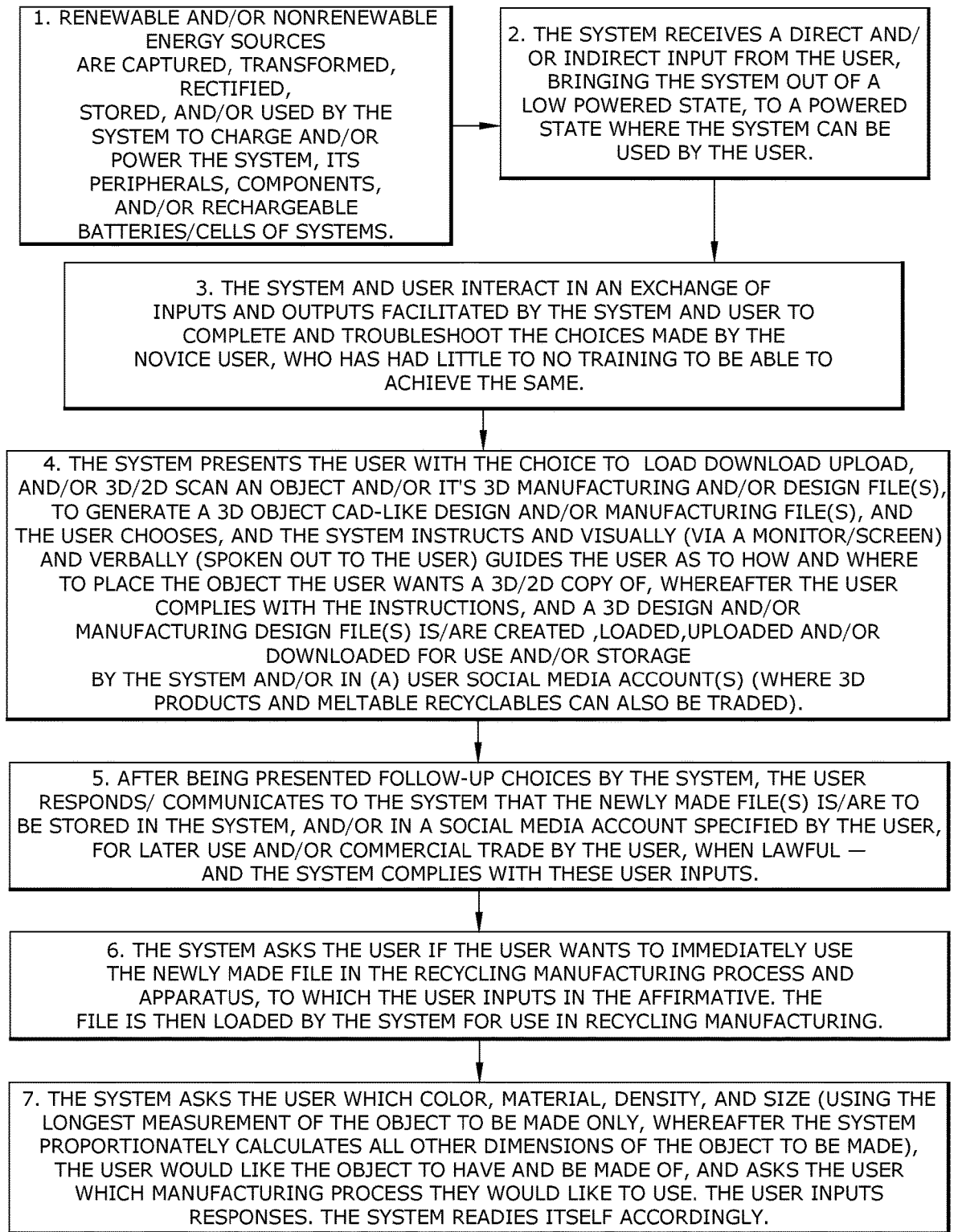
FIG.14    (B) TO FIG.15

FIG. 15

(B) FROM FIG.14

8. THE SYSTEM ASKS THE USER IF THEY WANT TO LOAD RECYCLABLE MATERIALS, USE STORED RECYCLABLE MATERIALS, AND/OR GENERATE AND STORE NEW RECYCLABLE MATERIALS. THE USER STATES THEY WANT TO DO ALL THREE, AND SO THE SYSTEM VERBALLY TELLS AND VISUALLY SHOWS THE USER WHERE TO LOAD THE STORED, AND SEPARATELY NEW, APPROPRIATE RECYCLED MATERIALS FOR RECYCLING, INTO THE SYSTEM, AND THE USER DOES THE SAME.

9. ONCE THE SAFETY-SWITCHED DOOR IS IN A CLOSED POSITION ONLY, THE SYSTEM'S RECYCLING SHREDDER IS ABLE TO SHRED THE LOADED OBJECTS TO BE RECYCLED INTO A MANUFACTURING MATERIAL FEED TO BE CAPTURED, STORED, TRANSFERRED, CLEANED, SORTED(OPTIONAL), AND/OR PURIFIED BY THE SYSTEM.

10. ONCE THE SAFETY SWITCHED DOOR LOCK IS IN A CLOSED POSITION ONLY, THE SYSTEM'S RECYCLING SHREDDER IS ABLE TO SHRED THE NEWLY LOADED MELTABLE RECYCLABLE OBJECTS TO BE RECYCLED INTO A MANUFACTURING MATERIAL FEED TO BE CAPTURED, STORED, TRANSFERRED, CLEANED,AND/OR PURIFIED BY THE SYSTEM, FOR USE IN ADDITIVE AND/OR SUBTRACTIVE MANUFACTURING WITHIN THE SYSTEM.

11. THE SYSTEM EMPLOYS THE NEWLY GENERATED 3D DESIGN AND MANUFACTURING FILE(S); THE PREVIOUSLY STORED, NEWLY ADDED STORED, AND NEWLY PURIFIED SHREDDED MELTABLE MATERIALS — ALONG WITH THE CHOSEN MANUFACTURING PROCESS(ES) AND APPARATUS(ES), TO MAKE AND COLOR THE OBJECT, IN THIS EXAMPLE, A RED BOWL (A 3D COPY OF A NEAR IDENTICAL RED BOWL SCANNED USED TO MAKE THE FILE USED) OUT OF A HOMOGENOUS, RECYCLED, AND PURIFIED WHITE MILK JUG PLASTIC, USING 3D PRINTING AND A FOOD-SAFE PAINT LOADED INTO THE PAINT GUN PAINT STORAGE UNIT, PER THE EXAMPLE USER SPECIFICATIONS,NOT LIMITED TO THE SAME.

12. THE SYSTEM MAKES A RED BOWL OUT OF WHITE PLASTIC AND RED PAINT USING THE RECYCLED AND CLEANED MELTABLE MATERIALS, THE 3D PRINTER, AND THE PAINT GUN, FIRST USING THE 3D PRINTING TOOL HEAD TO MADE THE WHITE BOWL, THEN ONCE COOLED, SWITCHING THE TOOL HEAD OUT FOR A PAINT GUN TOOL HEAD, STORING THE 3D PRINTING TOOL HEAD PRIOR TO PAINTING COMMENCING. DURING PROCESSING, ENERGY RECAPTURE DEVICES STORE, TRANSFORM, RECTIFY AND/OR USE WASTED ENERGY FROM THE SYSTEM, FOR EXAMPLE, BUT NOT LIMITED TO,CAPTURING HEAT, ROTATIONAL, ELECTRIC AND/OR MAGNETIC, AND/OR PRESSURE-GENERATED ENERGY DERIVED AND/OR WASTED BY THE SYSTEM, CONVERTING THE SAME INTO ELECTRICITY FOR USE AND/ OR STORAGE BY THE SYSTEM. A COOLING SYSTEM REGULATES THE TEMPERATURE WITHIN THE SYSTEM, AND FILTERS OUT TOXIC EMISSIONS THROUGH USE OF A FILTER AND FLUID COMPRESSION AND/OR VACUUM UNIT.

13. THE SYSTEM COMMUNICATES THAT THE 3D OBJECT HAS BEEN MADE ONCE THE PAINT HAS DRIED AS DETERMINED BY THE SYSTEM AND/OR THERMAL CAMERA WHICH ALSO HELPS WITH PROPER POSITIONING OF TOOL HEAD, IN COLLABORATION WITH POSITIONING SENSORS. THE USER REMOVES THE OBJECT FROM THE BUILDING CHAMBER, AND CONTINUES TO SAVE MELTABLE RECYCLABLES FOR TRADE, FUTURE DESIGNING, AND/OR RECYCLING- MANUFACTURING OF 3D OBJECTS AND/OR RELATED FILES.

APPARATUS AND METHOD FOR RECYCLING MATERIAL INTO AN OBJECT USING AT LEAST ONE OF AN ADDITIVE AND SUBTRACTIVE PROCESS, POWERED BY RENEWABLE, NON-RENEWABLE, OR INTERNAL ENERGY DEVICES, AND CONTROLLED REMOTELY BY ARTIFICIAL INTELLIGENCE, VOICE COMMAND, AND WIRELESS NETWORK CONTROLLERS

CROSS-REFERENCE TO RELATED APPLICATIONS

This application claims benefit under 35 U.S.C. § 119(e) of U.S. Provisional Application No. 62/412,697 filed Oct. 25, 2016 and is a continuation-in-part of U.S. application Ser. No. 14/960,190 filed Dec. 4, 2015, which claimed benefit of Ser. No. 62/087,350 filed Dec. 4, 2014, which are hereby incorporated by reference herein in its entirety.

BACKGROUND

The embodiments herein relate generally to recycling systems, and more particularly, to a rechargeable recycling, manufacturing, scanning, internet-of-things system and process facilitated by artificial intelligence and powered by renewable, standard, and/or recaptured energy systems.

The Earth has limited and unlimited raw resources, which are being exponentially depleted by an exponentially increasing human population, who buys products made out of these raw resources. The products made by these resources have a very short, useful life and thus, are contributing to an exponential increase in the amount of pollution, including, but not limited to, meltable pollution, also known as recyclables. As waste management is expensive and as recyclables are mostly not being recycled, the recyclables are causing environmental degradation, filling up the world's landfills, dumps, and waterways, threatening the health of life on Earth. Increased automation and the internet have resulted in massive unemployment and underemployment, which further increases armed conflict and crime for access to the resources required to survive and grow. Long supply chains, each of which requires a margin to be profitable, significantly increases the cost of products to consumers, who then save less and borrow more, which harms the economy.

Manufacturing new products requires expensive building materials, systems, and advanced knowledge, skills, and tools to convert materials into a new product. While 3D printing ("3DP"), injection molding/die-casting/other casting ("IM"), painting/dyeing ("coloring"), and/or 2D/3D and thermal scanning ("scanning") are traditionally additive processes, and CNC machining ("CNC") and is traditionally a subtractive process—3DP, IM, and/or scanning also wholly rely on subtractive processes like, but not limited to, tool head removing, software slicing, mono/poly-chrome and topographical contrasting, pixelating, compartmentalizing, and/or casting, not traditionally taught, just as CNC and recycling also rely on additive processes, like but not to software compilation, software updates, building material compilation, tool head replacement, and accumulative sorting, in a manner not traditionally taught, such that respectively and/or collectively these processes more often than not have both additive and subtractive processes, not traditionally taught, and leveraged in this invention.

All are useful in manufacturing, and many 3DP, IM, and CNC patents for systems and software have expired and/or have been made available for public use, allowing for their respective and/or collective use in new ways, yet 3DP, IM, and CNC typically consume costly one-time use material(s), which in the aggregate(s) can contribute to environmental pollution, and the over-consumption of new resources, building materials, or components thereof.

As can be seen there is a need for a novice-friendly decision-based input-output system facilitated by interactive software and hardware that communicates with users in a more natural visual and verbal manner, collectively known here as artificial intelligence, that can teach and provide either or both additive and subtractive processes, useful in manufacturing and product designing, while aiding in reducing environmental pollution, and reducing the consumption of non-renewable energy and new building materials or components thereof, by recycling and reusing many, most, if not all, meltable and/or recyclable materials to make new products for novice users, and using renewable energy and recaptured energy technologies, storable in rechargeable batteries to do the same.

Because different users have different consumption and manufacturing needs, most with little background, skills, knowledge, and experience in recycling, manufacturing, and product design processes, there is need for a scalable system that can assist novice users in how to control these processes to more readily produce items of their choosing. There is also a need for rechargeable systems described herein, which can be powered by renewable and/or standard energy sources, and/or use energy recapturing technologies, so that power consumption contributes as little as possible to additional resource consumption and environmental pollution, while allowing users more flexibility as to the environments where and how they can use this system, some mobile, fixed, outside, inside, remote, direct, and some on and off the Earth.

SUMMARY

In one aspect of the disclosure, a system for recycling, manufacturing, and/or scanning material in an additive and/or subtractive process comprises a frame; (a) machine(s) head(s) system(s) coupled to the frame and movable within (an) interior volume(s) of the frame, the machine(s) head (s) system(s) including: a first machine head configured to perform additive and/or subtractive manufacturing processes when attached to the clamp(s) and/or frame, and/or additional machine(s) head(s) configured to perform subtractive and/or additive manufacturing processes when attached to the clamp(s) and/or frame, and a mechatronically-controlled motor(s) control system(s) coupled to the machine(s) head(s) system(s); (a) grinder(s) module(s) attached to the frame, including: (a) hopper(s) for receiving many different recyclable and/or recycled meltable material(s), (a) grinder(s) for grinding the recycled meltable material into a grain, and (a) container(s) disposed to collect the grain from the grinder; (a) wash and dry module(s) coupled to the container of collected grain, the wash and dry module(s) including: a cleaning and drying fluid chamber, a first conduit connected between the cleaning fluid chamber and the container of collected grain, and a vacuum system configured to draw clean grain from the cleaning chamber, through the first conduit and into the container of collected grain; a mechatronically-controlled controller coupled to the motor(s) control system(s), the controller including (a) processor(s) configured to: receive (an) interactive user input request(s) for producing (an) additive manufacturing-based object(s) and/or a subtractive process-based object(s), issue user guidance commands to a user to input task commands performed by the system to manufacture the requested additive and/or subtractive manufacturing-based object and/or process, operate the pressurizable transportation, washing, and/or drying module(s) to clean and transport the collected grain for cleaning, storage, and/or use, when the grain is being used for an additive and/or subtractive manufacturing and/or recycling processes, control positioning and operation of the machine(s) head(s) system(s) according to the task(s) commands input(s) by the user to: melt the collected grain cleaned by the washing and drying module into a melted feed for additive and/or subtractive processes, load the melted feed into the first machine head coupled to the machine(s) head(s) system(s), extrude the melted feed from the first machine head(s) to form the requested additive and/or subtractive manufacturing-based and/or recycling-based object and/or, remove material from an arbitrarily-shaped object using the second and/or additional machine head(s). All this facilitated by the system's artificial intelligence, and powered by renewable, recaptured, standard, and/or rechargeable energy sources about, on, in, and/or attached to the apparatus of the system as described herein.

In another aspect of the disclosure, a process for recycling, manufacturing, and/or scanning material for reuse within a system in an additive and/or subtractive process comprises receiving system and/or (a) user input(s) and/or output(s) request(s) for producing (an) additive and/or (a) subtractive manufacturing-based, and/or recycling-based, and/or scanning-based object(s), and/or designs, and/or process(es), with artificial intelligence issuing step by step user guidance put and/or output commands to a user and/or the system to input and/or output task(s) commands performed by the system to manufacture, scan, and/or recycle the requested additive and/or (a) subtractive manufacturing-based, and/or recycling-based and/or scanning-based object(s), design(s), and/or process(es), including, but not limited to: inserting an object for scanning to create a design file to be used in conjunction with the system, and recyclable, meltable material(s) into (a) grinder module(s), wherein the user is providing types of items that are meltable and usable in the system, as facilitated by by artificial intelligence, and providing finished product(s) characteristics received by the system to produce the additive and/or (a) subtractive manufacturing-based, and/or recycling-based object(s), designs, and/or process(es), cleaning grain with a washing module of the system, grain collected from the grinder module produced by grinding the inserted recyclable, meltable, melting by a heat source in the system, the grain cleaned, dried, and transported by the washing, drying, and transportation modules into a melted feed for additive and/or subtractive manufacturing, recycling, and/or scanning processes, objects, and/or designs, loading the melted feed into the first machine head coupled to the machine head system, extruding the melted feed from additive and/or (a) subtractive manufacturing-based, scanning-based, and/or recycling-based module(s), design(s), and/or process(es) to form and/or generate the requested object(s), processes, and/or design(s), removing material from an arbitrarily shaped object placed in the system by using the scanning, subtractive, and/or additive process machine head(s) to produce the requested object(s), process(es), and/or design(s). All this facilitated by the system's artificial intelligence, and powered by renewable, recaptured, standard, and/or rechargeable energy sources about, on, in, and/or attached to the apparatus of the system as described herein.

BRIEF DESCRIPTION OF THE FIGURES OR DRAWINGS

The detailed description of some embodiments of the invention is made below with reference to the accompanying figures, wherein like numerals represent corresponding parts of the figures. Some and/or all of these referenced parts can be recombined in different configurations to yield alternative embodiments of the invention.

FIG. 1 is a perspective front view of a meltable material recycler system with user-sensing, 3DP, IM, coloring, scanning, and/or CNC machining functionality, able to be powered by renewable energy, recaptured energy, alternating current energy, and/or rechargeable battery direct current energy system(s), according to an embodiment of the subject disclosure.

FIG. 2 is a partial, perspective internal view of a bottom section of the system of FIG. 1 with panels and doors removed according to an embodiment of the subject disclosure.

FIG. 3 is a cross-sectional front view taken perpendicular to the direction of arrow head of line 3-3 of FIG. 2, illustrating the lower half of a fluid and materials cleaning and transportation system, coupled to a recycling system, and rechargeable battery system, recharged and/or powered by a renewable energy system, energy recapture system, and/or standard energy system.

FIG. 4 is a perspective front view of the system of FIG. 1 illustrating a change in position of a container of recycled material for use in recycling, reusing, renewing, scanning, coloring, 3D printing, IM, and/or CNC machining, processes, and/or processing.

FIG. 5A is a partial cross-sectional front view and top section view taken perpendicular to the direction of the arrow head of the line 5-5 of FIG. 4, illustrating the connection of a container of recycled material, to a conduit, which connects to a materials heating system ("MHS"). FIG. 5B is an enlarged sectional view of energy recapture sensors positioned between a grain storage container and a pressurizable fluid and recyclables materials transportation and cleaning system shown in part in FIG. 5A, used in part to power, recycle, renew, and reuse "homogenous" meltable materials, like but not limited to, meltable recyclables, with the same or similar optimal melting temperatures, affected by impurities.

Figure 6:
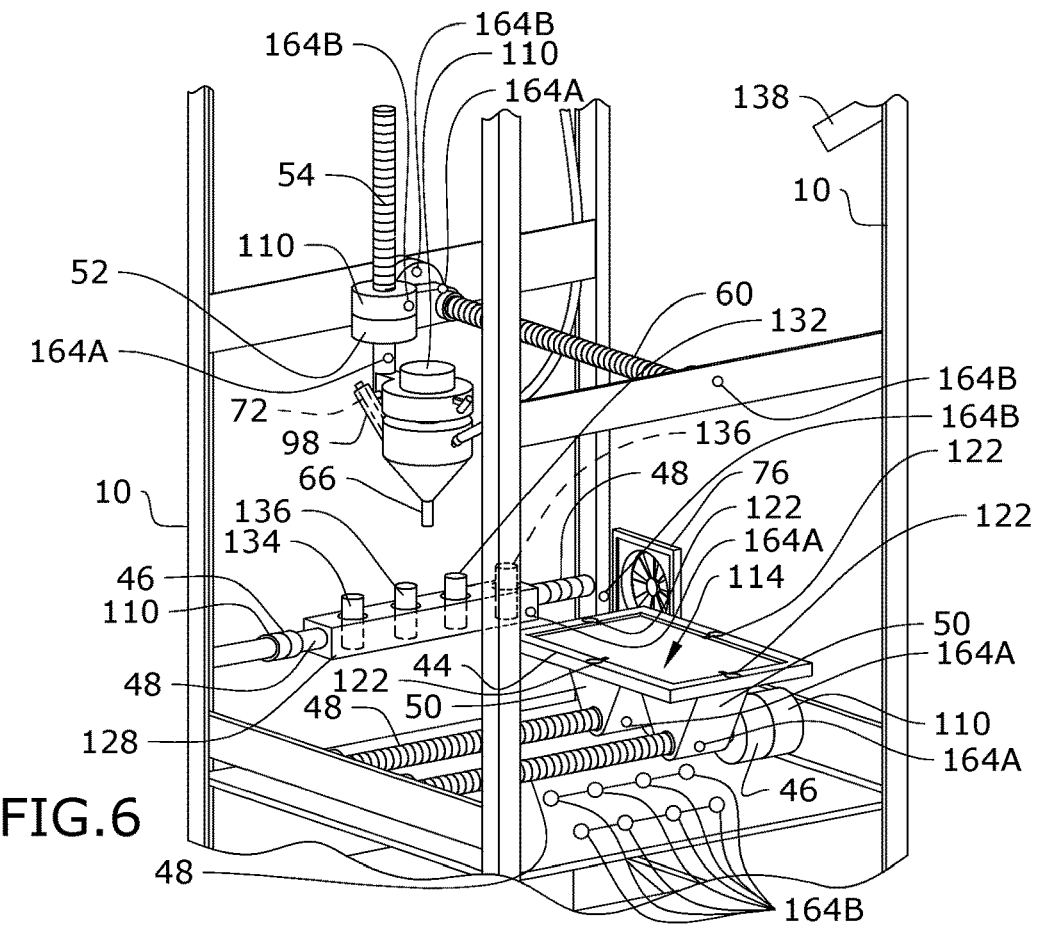
Figure 7:
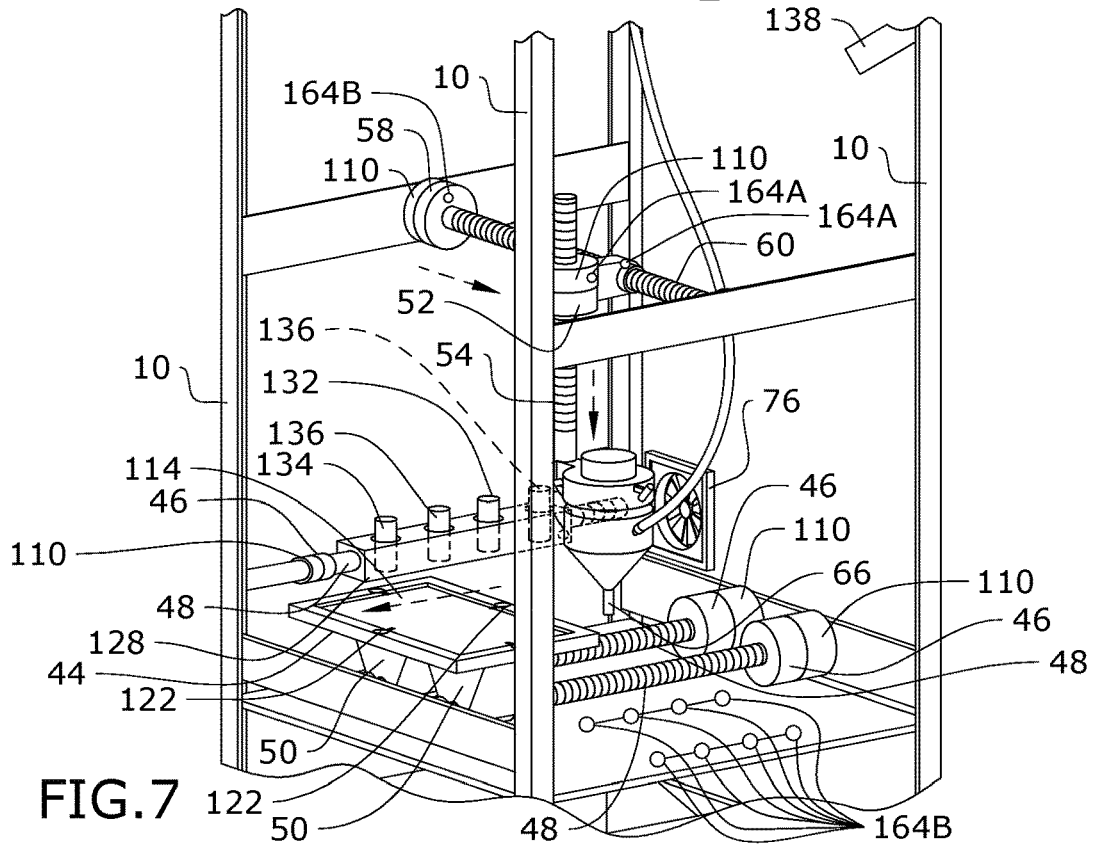

FIGS. 6-7 show a partial, front, perspective view of the interior of the system, and more particularly, a motor control of a MHS, positioning sensor system, a tool head storage and exchange system, and building deck in different positions, according to an embodiment of the subject disclosure.

Figure 8:
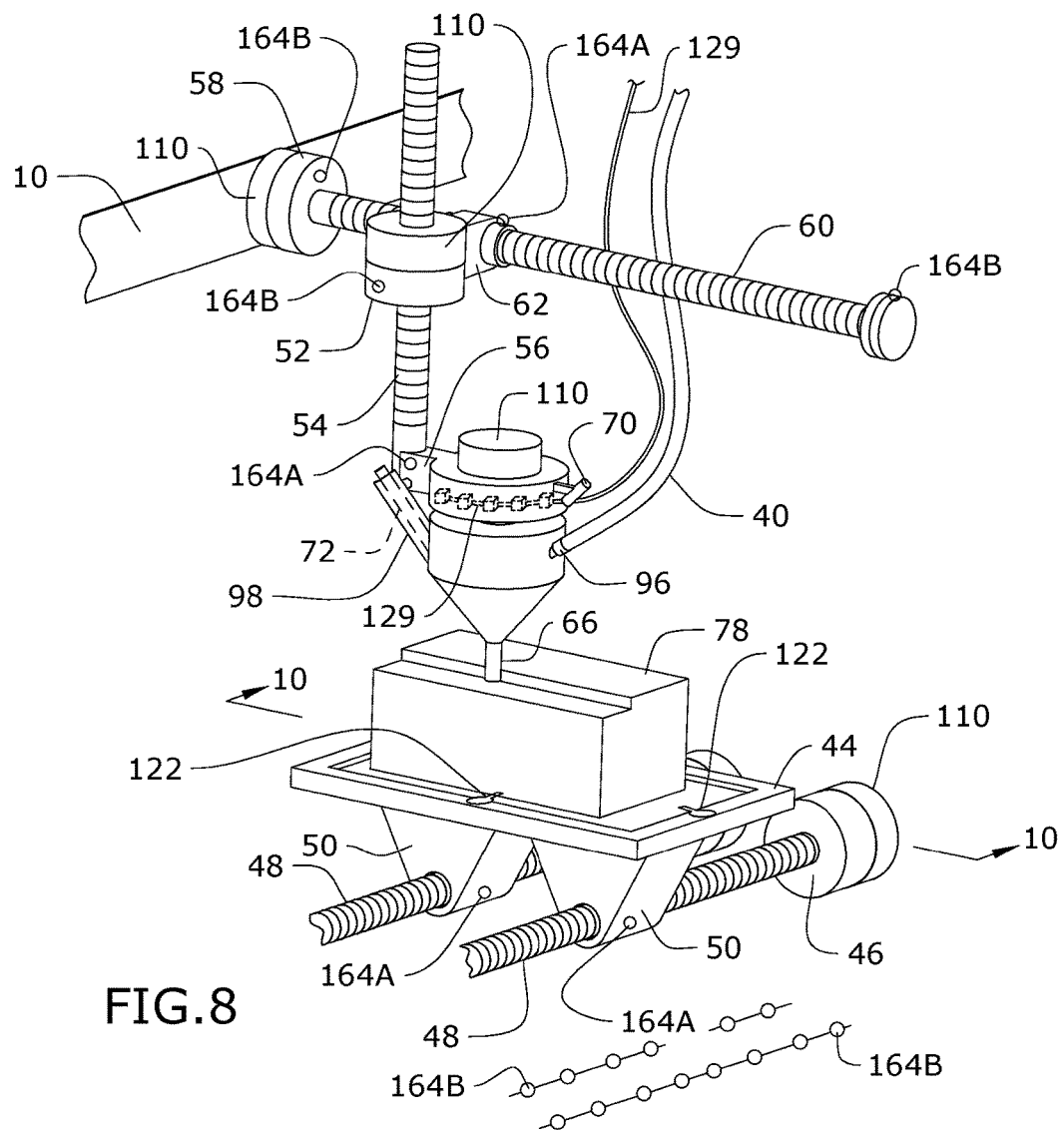

FIG. 8 is a partial, enlarged, perspective, front view, of the MHS, positioning sensor system, and building deck of FIGS. 6-7.

Figure 9:
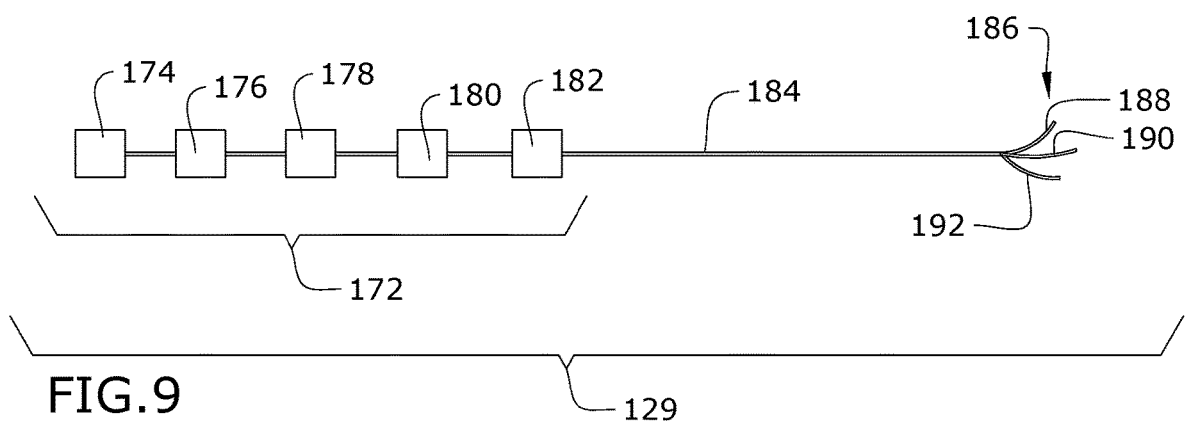

FIG. 9 is an enlarged partial view of an energy recapture system for embodiments of the subject disclosure.

FIG. 10A is a cross-sectional front view taken perpendicular to the direction of the arrow head in line 10-10 of FIG. 8, illustrating a 3D printer and an IM configuration of the MHS, with the additive process side of the reversible building deck positioned for facing the MHS. FIG. 10B is an exploded cross-sectional side view of the building deck of FIG. 10A used for 3D printing and IM configuration. FIG. 10C is a top view of the building deck of FIG. 10A.

FIG. 11A is a cross-sectional front view, illustrating a CNC configuration of the MHS, with the extruder funnel detached, over the reversible building deck positioned with the side for subtractive processes facing the MHS and with the CNC building material clamps revealed and employed about a CNC building block. FIG. 11B is an exploded side view of the reversible building deck of FIG. 11A. FIG. 11C is a top view of the building deck of FIG. 11A.

Figure 13:
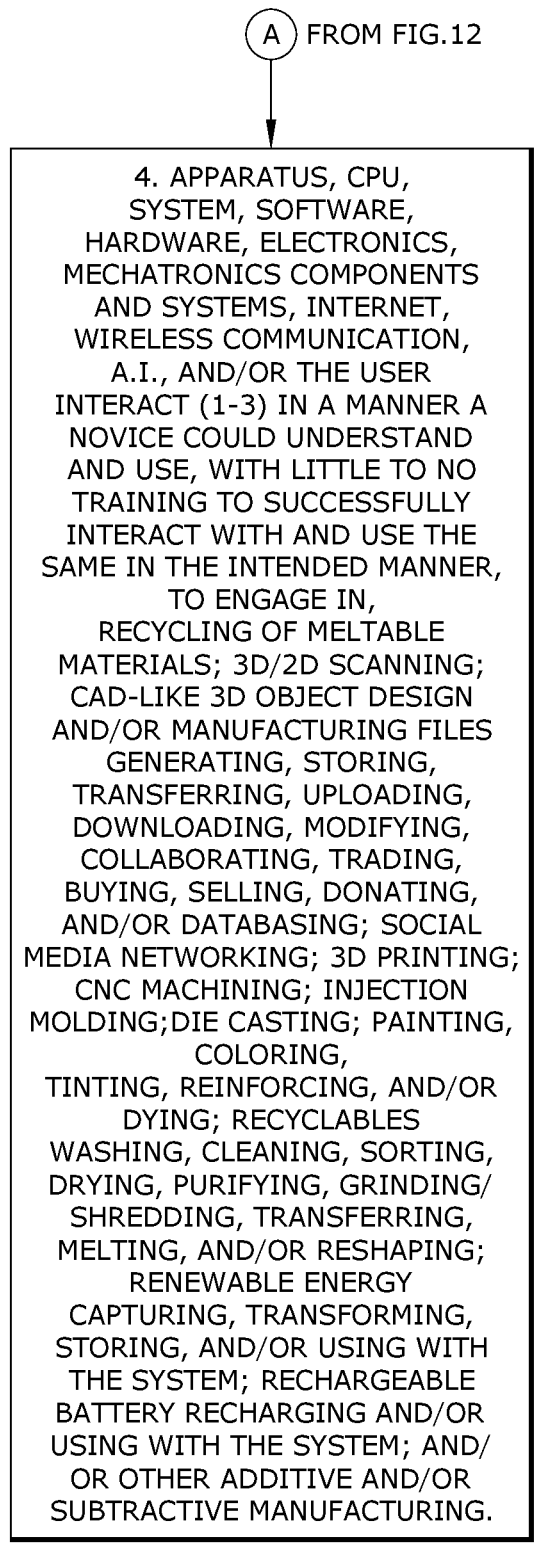

FIG. 12-13 are block diagrams representing operation of the system of FIG. 1 according to embodiments of the subject disclosure.

FIGS. 14 and 15 are a flowchart of a process user operation of the system of FIG. 1 according to an embodiment.

DETAILED DESCRIPTION OF THE FIGURES OR DRAWINGS

In general, embodiments of the present disclosure, provide a rechargeable system that may recycle a wide range of meltable material(s), and may re-use the recycled meltable material(s) within the system for additive and/or subtractive processing reducing and/or eliminating the need for new raw materials in the manufacturing of new products, a system which can be built or scaled smaller or larger to accommodate different user needs. Figures (sometimes referred to as "Fig.") 1 through 11C are exemplary embodiments of the system, and pertain to the additive and/or subtractive processing configurations of the system, including, but not limited to, the recycling, scanning, coloring, 3D printing, CNC, IM, hardware processing, software processing, firmware processing, mechatronic processing, washing/cleaning, filtering, materials accumulating, materials separation, materials transportation, drying, energy-generating, energy-storing, energy-transferring, product designing, and/or product making configurations of the system, described in part by processes described in FIGS. 12-15—but not limited to the same.

The meltable recyclables and/or other meltable material(s) may be ground into a shard, granule, crystal, particulate, shred, grain, and/or powder ("grain"), which can then be used as building material feed for recycling, scanning, 3DP, CNC, and/or IM which, may be used for manufacturing and/or design of a three dimensional ("3D") article or object.

The descriptions of the embodiments of the invention herein, coupled with FIGS. 1 through 11C, are collectively representative of embodiments of the invention, and as such, may collectively be referred to in general herein as the "system", while FIGS. 12-15 are collectively representative of operations related to the system and may be referred to in general as an embodiment of the related "process(es)", but not limited to the same.

A MHS 42 (FIG. 10A) and/or deck 44 (FIGS. 10A-11C) may be configured in the system for use in, additive and/or subtractive manufacturing, along with a smaller reversible building deck 114, locked into larger deck 44 by swiveling arms 122, a deck 114 which allows for use of toothed-screw clamps 120, along tracks 124, on one side only, to clamp down objects 78, as required or instructed by the system 82 (FIG. 1) and/or or process (FIG. 12-15).

As will be appreciated, the system makes use of what would otherwise be waste products contributing to global pollution, and instead re-purposes meltable recyclable material(s) and/or other meltable material(s), into useful end products, in addition to reducing the need for new, unused, and/or expensive building materials or consumables for creating 3D articles or objects.

As will be appreciated, aspects of the system and processes reduce the meltable pollution or recyclables on Earth by giving a new value to recyclables as free (or at least inexpensive) building material for the production of new products and designs, while reducing the energy consumption of the system by employing not just standard energy sources, but also, and/or alternatively, renewable, recaptured, and/or rechargeable energy sources.

In addition, aspects disclosed reduce the rate of environmental degradation by repurposing more recyclables into new products, by reducing the rate at which meltable pollution can enter the environment to pollute allowing the Earth more time to recover.

Further, there is a reduced need of others to buy what they can make, and in doing so, breaks the buy-new cycle and reduces the conflict required to access new raw resources to make new products, reducing armed conflict in the world, increasing economic stability, prosperity, quality of life, happiness, creativity, and human potential.

Moreover, aspects of the subject technology allow users to take a world problem, garbage, and repurpose the same into over seven hundred thousand different new products or solutions, which creates a potential for users to make and sell products, designs, and recyclables materials to others, to not only have the invention pay for itself, but to potentially make a significant profit, and as such this invention could allow someone to become employed as a manufacturer, reducing their need to engage in crime and/or conflict to access the resources required to survive, bettering the social fabric and infrastructure.

The system disclosed decentralizes the power and influence of the world's oligarchs, by allowing many homes and offices to make new inexpensive products out of their own garbage instead of constantly buying expensive products. As a result, the need for expensive supply chains is reduced, increasing savings and profits, which can benefit the economy.

As will be further appreciated, some embodiments may be facilitated by artificial intelligence (AI), so that novice users can make and/or design products with one system, and/or generate, load, upload, download, and/or trade designs and/or materials as guided by and instructed by AI.

In some embodiments, the system may include a proximity activation system 160 (FIG. 1), which powers up the system from a low power state of hibernation, intended to save the amount of energy used by the system, when not in use. The activation system 160 may include for example, thermal, pressure, light, movement, sound or other sensors, which may detect a user's proximity to the system and in response, activate the system.

In some embodiments, 82 (FIG. 1)—a mechatronically-controlled and operated user interface or controller, central processing unit ("CPU") or controller's processor, monitor/touch screen controller, light emitting diodes, static and/or dynamic and fixed and/or removable memory drives, expansion cards, input/output devices, printed circuit motherboard, peripherals, wireless networking, network, server, microphone controller, speaker, wiring, cables, connectors, operating system, software, firmware, artificial intelligence controller, and/or mechatronic components—may issue (a) verbal/audio and/or visual request(s) to the user, asking the user whether or not to input if they wish to operate the system when detected within proximity, presenting the user with use and/or troubleshooting input and/or output choices and/or directions, as specifically described in the embodiments found in FIGS. 12-15, but not limited to the same.

In some embodiments, the system and its components may be powered by the system's power cord and plug 108 (FIG. 1) and/or by a rechargeable battery 88 (FIG. 3), which may be held by the battery rack 102 (FIG. 3) and/or by an energy recapture, generating, and transfer system 129

(FIGS. 3, 5, 8, and 9) and/or by a renewable energy system 170 (FIGS. 1 and 4), which may or may not include the rechargeable battery 88, as governed by 82.

In some embodiments, the system may be configured to use a renewable energy source 170, which may employ a renewable energy power source regulator 106 (FIG. 1), which with 82 transforms, rectifies, capacitates, and/or delivers variable electrical energy to the system in a useable and controlled manner, to prevent power surges and damage to electrical components within the apparatus of the system.

The recapture energy system 129 may include for example, environmental sensors 172 configured to detect sources of energy given off by processes when the system is in operation and generate electricity to power the system in response to detection. For example, the recapture energy system 129 (FIG. 9) may include, pressure sensor generators 174, positioned near elements that receive weight (such as containers receiving recycled material (FIG. 5A, but could also be found under 20 in the lower position 26 (FIG. 4) in another configuration) or under melted material (FIG. 10A) etc.); heat sensor generators 176 positioned on the frame 10 (FIG. 5A), camera 138, tool head (FIG. 8), and near the building area of deck 44 (FIG. 5B) so that heat generated during building is recaptured; vibration sensor generators 178 positioned near for example, moving elements (FIGS. 8 and 3); rotational sensor generators positioned proximate rotating elements (FIGS. 8 and 3) such as those moving on threaded shafts (described below); electromagnetic (22, 52, 164B) and/or photovoltaic-based 170 sensor generators detecting electromagnetism from the environment and/or system components. The frame 10 and panelling 12 may have heat dissipating and/or energy-generating capabilities when paired with heat micro-generator 176.

As the sensors detect their respective energy sources, and generate electricity, wires 186 (positive wire 188, negative wire 190, and ground 192 wrapped within insulation 184) transfer electricity to, for example, the battery pack 88, powering system 108, and/or regulator 106.

It will be understood that the regulator 106 may be integrated onto the system or may be separable/distinct and plugged into plug 108.

As will be appreciated, the rechargeable battery pack 88, the renewable energy power source regulator 106 provide, the renewable energy power generator 170, the powering system 108, and/or the recaptured energy system 129 power self-sufficiency allowing the system to be mobile and untethered to an electrical grid.

Accordingly, embodiments of the system may be powered and recharged by renewable 170, rechargeable 88, recaptured 129, and/or primarily non-renewable ("standard") energy sources 104 (FIG. 1), via the power cord and plug 108.

The internal components of the system may be configured to provide additive and/or subtractive manufacturing, recycling, and/or scanning processes as described in more detail below. To facilitate or govern recycling and additive and/or subtractive processes, a software-controlled panel and monitor 82 may provide a user interface to control the operation and/or movement of the system's components, and/or to add, delete, store, and/or modify (via embedded operating system, USB, Bluetooth, Wi-fi, and/or other technologies) the system's software, and/or related 3D manufacturing software, and/or designs.

Some embodiments may include an infrared camera 138 to monitor and/or troubleshoot the status of a build, and/or to monitor the integrity and/or positioning of the moving system components and/or build, in collaboration with the systems' control interface 82, and/or in collaboration with positioning sensors 164A and 164B (FIG. 8), and/or in collaboration with the systems' temperature sensors 70 (FIG. 8) and/or heat microgenerators 176, 129, 172 (FIG. 8), and/or in collaboration with the user (FIG. 12-15). The controller may use the infrared camera 138 signal to alert the user if a part of the system, process, and/or build may be failing, to be able to facilitate the troubleshooting of the same with and/or without the user, depending on the situation.

As described in FIGS. 12-15, and FIGS. 1-3, once the system recognizes the user want to use the same, and powers up from hibernation mode, and presents the user with the verbal and visual options, instructions, and location to recycle meltable materials, as selected by the user, the user places clean or dirty homogenous materials 30 through the recycler door 14, which enter the recycling chamber 36, down a hopper (FIG. 3). Once the door safety switch lock couplers 116 close the switch, and lock the door, the system knows that it is safe to start an x-axis motor 58 spinning the grinder 22, and descending the form-fitting crushing plate 118 using another motor 52, which forces the meltable recyclables into the grinder.

Once the meltable material is ground into a grain 32 by the grinder 22 and plate 118, the grain 32 may be collected below the grinder/hopper compartment 28 in a removable container 20 located in a collection compartment 26, which may readily be accessed through door 34 (FIG. 1).

Some embodiments may include a pressurizable washing, drying, and transportation system coupled to the removable container, as to allow the user to not have to remove the container, and/or to make use of two removable containers at the same time, one in the upper rack/shelf 38 (FIG. 1) and/or one in the lower rack/shelf 26 (FIG. 2).

To help preserve the need to use homogenous meltable materials with the same or similar optimal melting temperature ranges—to eliminate or reduce the meltable materials of impurities—embodiments may include a pressurizable washing and drying module 140 (FIG. 3) to wash and dry material grain 32. The washing module 140 may contain cleaning fluid (fed via ingoing valve 166) which may be drawn in and/or out of the cleaning module through mechatronically-controlled outgoing valve 168. Mechatronically-controlled valves 168 and 196 allow for fluids to be added or removed from the system to help enable the washing and drying functions.

In some embodiments, material from 20 may be cleaned and dried in the washing module 140 by the turning of a waterproof rotary propeller 194 connected to the Y-axis shaft 54 of the Y-axis motor 52 of the positioning system (described below) for motorized washing and drying of the grain 32. Dirty and clean grain 32 may be drawn up out of container 20 while positioned in the grinder chamber 26 by a fluid compressing/vacuuming/blowing unit 127, which may pressurize and depressurize fluid along chambers 127, 140, and 146, via pressurizable conduits 200, 150, and 154, governed by mechatronically-controlled pressurizable valves (FIGS. 5B, 5A, 3, and 1) 196, 166, 168, 142, and 148, to be able to clean, dry, store, move, and use grain 32 about the system, for use in additive and/or subtractive recycling, manufacturing, and/or scanning processes.

As will be appreciated, the inclusion of washing and drying module 140 provides users an uninterrupted switch from subtractive recycling processes back to additive processes as recyclable material, without having to hand-clean the same.

Referring to FIGS. 3, 4, 5A, and 5B, the system may also include a vacuum unit 127 including an air filter (for example, a charcoal filter) purifying air from the system. As will be appreciated, emissions from the additive and/or subtractive processes may cause noxious fumes, which are not conducive to a home or office environments, when using the system indoors. For example, when plastic is heated (as in the process of melting ground up grain 32 for additive processes or when a subtractive process is removing material from an object created by the additive process), if the plastic is heated improperly, foul smelling emissions may permeate the area.

The vacuum-blower unit and replaceable filter combination 127 may filter air derived from air-in mechatronically controlled air valves 142a (drawing in exterior air) and 142b (drawing in air from the interior of the building chamber) which may draw system fluid in, through, and out of the system, with or without dirty or cleaned grain 32 via pressurizable conduits 200, 150, and 154, employing mechatronically-controlled valves (FIGS. 5B, 5A, 3, and 1) 196, 166, 168, 142, and 148. The air filter may include a vacuum blowing fluid compression unit to clean air from mechatronically controlled air valves 142b. Air entering the pressurizable chamber 146 may be filtered and returned for use into the system via mechatronically controlled valve 148b, or may be expelled from the system via air-out 148a (FIG. 5A).

As will be appreciated, the filtered outgoing air within the system via air-out 148b, may be used to move fluid or elements throughout the system, without contaminating the homogenous materials, which need to be homogenous or near homogenous regarding their type of material(s) and/or optimal melting temperatures, employing pressurizable storage chamber 146 and mechatronically-controllable valves 196.

Also, such a system via conduit 150 may be connected to valve 148b and to other parts of the system that need forced air such as the paint gun tool head 134, tool head 136, and/or disconnected from conduit 154 to function as a chamber blower 150 (FIG. 5A) for system clean-up. A conduit 150 (secured to the frame by a clamp 152) may in some embodiments connect to a conduit 154 (FIG. 3), which is connected between the collection chamber 20 via conduit 156 (with air/cleaning fluid entering the collection chamber 20 being controlled by valve 158) and may be pressurized and depressurized in coordination with controllable valves 196 to transfer grain 32 to the washing and drying module 140, and also to blow grain down and around container 20 eventually into conduit 40 and then into subtractive and/or additive recycling and/or manufacturing with the MHS 42. When grain 32 is ready to be used in the MHS 42, the dried grain 32 and air fluid from 140 passes through mechatronically controlled valves 196 and conduits 154, 150, and 156 through valve 158 into container 20, for future use in additive and/or subtractive manufacturing, recycling, and/or scanning processes.

In some embodiments, the replaceable filter and vacuum-blower combination from 127 is connected to the mechatronically-controlled valve/conduit 200, which in turn connects to pressurizable chamber 146. Collectively, this vacuum-blowing, filtered, cleaning, and drying system allows for very homogenous material being used in the system, and allows for grain 32 to make its way through various chambers in the system.

FIG. 1, FIG. 4, FIGS. 10A-10C, and FIGS. 11A-11C illustrate the first of two fundamental differences between the system's additive and subtractive processing configurations, where the MI-1S 42 extruder funnel 66b (FIG. 10A), and associated MI-1S 42 threaded lid 66a (FIG. 10A), for use in additive processing functionality, may be removed in FIG. 11A, to allow for subtractive processing functionality.

To make the change from additive to subtractive processing configurations, the extruder funnel 66b may be unscrewed from the MI-1S 42 threaded lid 66a. The lid 66a may screw onto a thread 90 about the exterior base of the MI-1S 42 drill bit clamp 86 (FIG. 10A). Once unscrewed from the base of the drill bit clamp 86 (FIG. 10A), the threaded lid 66a, and the threaded extruder funnel 66b, which can screw together to form a chamber, may be collectively stored on storage hooks 18 (FIG. 4), which may employ a storage ring 126 attached to extruder funnel 66b, and typically also store with an unclamped drill bit 64, for the purpose of having a dedicated lid 66a, funnel 66b, and drill bit 64 complex 84 (FIG. 1), for dedicated use with different homogenous meltable recyclable and/or other meltable materials. Complex 84 may also be stored with other tools 136 on the tool exchange system 128 in one of the holding/releasing clips 130, to be exchanged by the system, where the moveable tool head can access the tools in the tool exchange system 128 (FIGS. 6-7), snapping tools heads on and/or off using any number of configurations, for example snap in lock system, and/or electromagnets, but not limited to the same.

The complex 84 arrangement permits one to not have to clean or cross-contaminate lid 66a, funnel 66b, and drill bit 64 when using the system with more than one homogenous melting material over the system's useful life, so that each homogenous melting material type would typically have a dedicated melting complex 84 (FIG. 1), composed of a dedicated lid 66a, dedicated funnel 66b, and dedicated drill bit 64, a complex 84 which may be collectively stored on hooks 18, and/or on motorized tool head exchange complex 128 when other meltable materials 30 are being employed for future additive and/or subtractive recycling, manufacturing, and/or scanning, other than the homogenous meltable material that the complex 84 is dedicated to.

Similarly, ground homogenous grain 32 in many different collection containers 20 may be removed from compartment 26 and stored for future homogenous or dedicated use. In another embodiment, for the system's subtractive processing configurations FIGS. 11A-C, dedicated drill bit(s) 64 and/or other CNC machining tools that fit in the drill bit clamp 86, may be used and/or stored on/in the small external box, cabinet, and/or shelf/shelves 94, generally depicted in FIG. 4 and FIG. 1, attached to the system's panel components 12 (FIG. 1), which may be attached to the system's frame components 10 (FIG. 1).

In another embodiment, the second of the two fundamental differences between the system's additive and subtractive processing configurations, may do with the position of the reversible and lockable building deck 114 (FIG. 10A-10C and 11A-11C), embedded and locked into the worker's building deck 44 (FIGS. 10A-10C and 11A-11C). The lockable building deck 114 is locked by pivoting locks/arms 122 (FIGS. 10A-10C and 11A-11C) which pivot from the worker's deck 44, over the reversible deck 114. Here, the additive processing configuration, per FIG. 10A, may store and conceal the separate adjustable toothed-screw clamp(s) 120 (FIG. 10A and FIG. 10B) embedded in deck 114 for typical use with securing arbitrarily shaped objects 78 in place during CNC machining, where each clamp 120 may be found on separate and differently-oriented tracks 124, within one side of the reversible building deck 114, one track 124, for each adjustable toothed-screw clamp 120, which otherwise, when in CNC configuration, may collectively be revealed, employed, adjusted, screwed down, and/or clamped about blocks of recycled material made by the system and/or other CNC building materials, for CNC machining. The adjustable screw clamps 120 employed in CNC machining configuration may be concealed or stored by the additive processing configuration (FIG. 10A), by flipping over and locking the reversible building deck 114, storing the adjustable screw clamps 120, which may be stored in fitted voids, grooves, or tracks within the worker's deck 44 during the additive processing configuration, locked down by locks/arms 122.

An alternative embodiment may employ the screw clamps 120 and tracks 124, embedded in deck 114, for use with IM, allowing the subtractive function of the reversible plate 114 to be used in an additive IM function. In another embodiment, IM cast(s) may be placed on deck 114 and under the funnel 66 spout, to be filled by the molten meltable materials 74, derived from the additive processing configuration, a form of stationary 3DP, on a CNC and/or 3DP scaffolding.

An alternative embodiment has more or less than four sets of screw clamps 120, swivel arms 122, and/or tracks 124 in any configuration, form-fitting in appropriate and different 44 depressions, when stores, to be able to hold onto many different objects of varying geometries.

When used in a CNC (subtractive) or injection molding configuration (additive), the reversible plate 114 has its four adjustable and toothed screw clamps 120 facing up, exposed on the relative surface of 114, four clamps which slide along each of their four respective tracks 124, to be able to clamp down objects on the surface of 114, for example, but not limited to, a building block for CNC machining, or a mold for die casting, injection molding, or other similar processes whereby a molten "male" material, takes the shape of a boundary "female" void (with a higher melting temperature than the molten material, as not to have the die-like boundary melt in the process). The four swivel arms 122 on the larger building deck 44, in which the reversible deck 114 resides therein, locks down the reversible building deck 114, by rotating inward over 114. This is important during injection molding, die-casting, and CNC machining, for stabilizing the object being locked down by the tracked-clamps, but most important to CNC machining, to stop rotational forces and angular momentum from changing the position of the building block, which must not be able to move during the CNC machining process, to maintain the integrity of the shape-changing subtractive process, till the desired shape is achieved.

For the additive configuration, swivel arms 122 on building deck 44 are rotated outward and off of plate 114 to release reversible plate 114 from being locked down, allowing it to be removed and flipped over. Then arms 122 may be swiveled back in and over plate 114, again locking the reversible plate 114 to deck 44, but this time the clamps 120 are facing down into deck 44, in a form fitted manner, which helps lock down reversible plate 114. The result is that the flat surface of plate 114 (without clamps exposed) is now exposed, allowing for 3D printing on that flat surface. As will be further appreciated, the system is compatible with many secondary processes to enhance the additive and subtractive main processes. Referring to FIG. 6, for example, a plurality of interchangeable tool heads which may be used to provide additional design process may be stored on a rack 128. The rack 128 may include individual unit holders 130 which may store for example, a 2D/3D scanning head tool, a painting/dying tool head 134 with container attached for spraying, and other tool head types represented by tool head 136.

FIG. 1, FIG. 2, and FIG. 3 show an exemplary embodiment of the system's recycling configuration using high refractory materials, like, but not limited to, tungsten or silicon carbide, where typically homogenous meltable recyclable materials 30 (for example, metal(s), glass, plastic(s), ceramics, asphalt, concrete, minerals, and/or rocks) may be washed and/or collected for recycling, and then fed into the grinder/hopper compartment 26 (FIG. 3) through the grinder/recycler door 14, and under the compression plate 118 in compartment 36 (FIG. 1 and FIG. 2) through the grinder/recycler door 14. The compression plate 118 may be lowered onto the material 30. FIG. 3 illustrates where materials 30 may be received within compartment 26. FIG. 4 illustrates, once the removable container 20 is removed as indicated by the arcing upwards motion in FIG. 4, it may be positioned in the removable container support rack 38 (FIG. 4 and FIG. 5A), and coupled with the grain conduit 40 (FIG. 5A) connected to and/or flowing from support rack 38 floor/hopper to the mechatronically-controlled feed valve 96, feeding MHS 42 (FIG. 4) funnel 66 (FIG. 10A).

FIG. 1 illustrates that door 14 may have software-controlled near-coupling magnetic sensors and a safety lock mechanism complex 116, which may only allow the axis of the jagged grinder wheels 22 (FIG. 3), rotated by the grinder motor 24 (FIG. 2), driven by a dedicated motor driver 110 (FIG. 2), to operate or rotate when the two mechatronic safety sensors/switches may be within one inch of one another, effectively when door 14 is down, closed, and locked, and when the grinder is activated using the system's user interface and monitor controlling complex 84 (FIG. 1). Otherwise, if door 14 is ajar, the grinder motor 24, and dedicated motor driver 110, and thus the grinder, may be deactivated, by cutting the power to the motor driver and grinder motor, as a safety feature to typically prevent grinder-related hand and/or other injuries. Similarly, once the grinder 22 is activated, door 14 may not be opened until the grinder rotations come to a full stop, at which point the grinder door 14 may be opened. Once the grinder door 14 is closed and locked by the coupling sensors and safety lock complex 116, and once the grinder motor 24 is activated at/by the user interface control 82, the meltable material 30 may be ground down into grain 32 (FIG. 3) by the activated grinder 22, in coordination with the grinder/hopper-fitted compression plate 118, attached to an ascending and/or descending Y axis docking unit 56, about a Y axis threaded/non-threaded shaft 54, ascended and/or descended by the rotation of the Y axis shaft 54 by a Y axis motor 52, governed by a dedicated motor driver 110 attached to the ceiling of compartment 36 (FIG. 2), connected like all other dedicated motor drivers of the system to a breakout board 100, which is powered like all other energy source dependent system parts by an internal and/or external renewable and/or non-renewable energy source.

FIGS. 1 and 4 through 8, detail the positioning of MHS 42 (FIG. 4), and/or the worker's deck 44 (and embedded reversible deck 114). The MHS 42, and/or building deck 44, may be mechatronically-controlled by interface 82 for operation along three or more axes (x,y,z). Alternative embodiments may allow for different combinations of the MHS 42 and building deck 44 along these three or more axes. The interface/controller 82 may be electrically connected to a breakout board 100 for controlling operation of the following elements. In some embodiments, the MHS 42 may be coupled to x (58), y (52) and z (46) axes motors and each of their dedicated drivers 110 controlling movement along a y-axis threaded/unthreaded shaft 54 using y-axis motor 52 and an x-axis threaded/unthreaded shaft 60 using x-axis motor 58 for movement in two directions. Mechatronically controlled positioning sensors 164*a* and dynamically controlled positioning sensors 164*b* may provide feedback signals to the interface/controller 82. A building deck 44 (on docking unit(s) 50) may be coupled to a z-axis shaft(s) 48 and z-axis motor(s) 46 for movement in a third direction. The interface controller 82 and/or its associated software(s) and/or 3D object design file(s) may coordinate the operation of the drivers 110, to move the x (58), y (52) and z (46) axes motors, to change the position of the x (62), y (56), and z (50) docking units, to precisely position the MHS 42 and/or building deck 44 in such a coordinated manner as to facilitate the manufacturing of 3D printed, CNC machined, and/or IM designs objects on the smaller reversible building deck 114, locked into and embedded into the larger building deck 44 (FIGS. 9 and 10), based on 3D printing, CNC, and/or IM software(s), design(s), file(s), and/or cast(s) respective specifications.

Referring to FIGS. 5A-10C and 11A-11C, details of the system's MHS 42 and/or building deck 44 are described in the context of a 3D printer system, CNC machine, and IM. Pertaining to the function of MHS 42 in 3D printing, CNC machining, and IM processes, the conduit's 40 software-controlled opening/closing valve 96, may in coordination with the control interface 82 and temperature sensor 70 of funnel 66, optimally feed grain 32 from container 20, into a side opening of the MHS 42 funnel 66 of complex 84, onto the mechanical filter 92. The filter 92 which may be fitted and fixed/welded to, and/or designed into the inside of funnel 66, to prevent mechanical filter 92 from spinning when drill bit 64 may be activated during molten material 74 extrusion, and where drill bit 64 fits/penetrates through funnel 66 and filter 92, stopping just short of the semi-sealed spout at the bottom of the funnel 66, which may have an aperture of any desired diameter, where a larger aperture diameter may result in faster 3D printing times, and decreased print quality and resolution, and where a smaller aperture diameter may result in the opposite. The funnel lid 66*a* may be combined with the MHS 42 threaded chamber lid 90 and funnel 66*b* to form a semi-sealed melting chamber, super-heated by an energy source (a laser in this embodiment) 72 in collaboration with temperature sensor 70, controller/interface 82, and its associated software and files, where funnel 66*b* may be screwed onto lid 66*a* about the drill bit clamp 86, a clamp 86 which may hold the drill bit 64 for 3D printing and/or IM additive process molten material extrusion, and/or CNC machining for subtractive processes. In some embodiments, a funnel 66 (for releasing heated grain 32) and/or other components of the system, may be built out of highly refractory and/or temperature-resisting materials, such that funnel 66 may be adapted to temperatures in the 50-6000+° F. temperature range (depending on the embodiment), when directly and/or indirectly heated by a high energy source (depicted here by a laser 72), which may be covered by a secondary (laser) eye safety shield 98, a half pipe about laser 72, where both shield 98, laser 70, and temperature sensor 70 may be connected to docking unit 56, and where shield 98 may further block the direct viewing of the laser 72, in addition to shield 80 on door 16, and where safety lock-switch 116 prevents the system from working if and/or as soon as the door is opened. By employing highly refractory and/or temperature-resistant materials to build funnel 66*b*, lid 66*a*, clamp thread 90, drill bit 64, drill bit clamp 86, and/or any other part of the system, the system may melt most of the most common types of homogenous and/or heterogenous recyclable and meltable garbage and/or other meltable materials (processed into the grain 32) into free or inexpensive building materials for the construction and design of 3D objects, for example 78 (FIG. 8). A temperature sensor 70 may monitor the temperature of funnel 66, in collaboration with drill bit 64, motor 68, and valve 96, so that the grain 32 may achieve a continuous molten feed source 74, which may run through filter 92, for drill bit 64 and funnel 66 extrusion onto deck 114 for 3D printing, IM, and/or for making blocks for CNC machining purposes, when configured to do the same, and as specified and/or controlled by controller 82 and/or associated software and/or files. A fan and/or air conditioner-like cooling system 76 on the frame 10 may be used to control or lower the temperature in the system, along with pressurizable air in 142A/B and air out 148A/B (FIGS. 5A and 5B). Furthermore, because this aforementioned pressurized system can move fluids around the system, another embodiment allows water and/or air from 140 and/or 146 to reach the building chamber to control humidity, which like temperature needs to be controlled during the building process and which differs in different environments, requiring an adaptive system to control the same. Such an embodiment would make use of existing thermal sensors 129/camera 138, and/or additional humidity and/or positioning sensors, to determine the humidity, along with 82. Another embodiment employs a monitor 162 on such a system for the purpose of the AI having an additional interaction tool, and/or for branding/marketing purposes. An alternative embodiment not shown allows 82 to communicate with social media accounts, memory drives, online and cloud databases and communities, to load, download, upload, trade, transfer, collaborate, and/or donate products, materials, and designs, using this invention, and/or associated social media accounts. As will be appreciated, grain container 20 may be used in manufacturing in a manual or automated manner, depending on the embodiment. As will be appreciated, the user no longer has to purchase expensive filament but may instead use common recyclable material to create many functional articles of manufacture.

Referring now to FIGS. 12-13, a schematic connection of the system is shown according to an exemplary embodiment. Box 1A represents the means for proximal or direct, primary input received by the system. These means may include input received by proximity sensors, audio sensors, voice commands, and touch based detection of buttons, screens, etc.

Box 1B represents means for remote or indirect, secondary input received by the system. These inputs include receiving wireless signals by the controller and/or AI element.

Box 2 represents bringing the system into an operational state including in some embodiments, awakening the system from a hibernation state in response to received input (for example, as received by an input of Box 1A or 1B).

Box 3A represents an embodiment of the system which includes an AI guided process for the user to produce an object by the additive and/or subtractive processes of the system. The AI may provide step by step instructions for the user with prompts of what button or feature should be controlled to produce a desired object. The user may provide the system with a description of the object including characteristics such as shape, color, size, and material density, which the AI uses to determine the path needed to achieve the object.

Box 3B represents a system driven process of providing more detailed instructions to the user to complete the object.

Box 4 represents a detailed number of actions taken by the system as the user engages with the system under the guidance of boxes 3A and/or 3B.

FIGS. 14-15 show a process for producing an object using the system according to an exemplary embodiment. In the first step, renewable, rechargeable, recaptured, and/or non-renewable/standard energy sources may be stored and used by the system.

Next, a direct or indirect input by the user triggers the system into an on state, which in some embodiments awakens the system from hibernation.

Next, the user may provide inputs for the system to use to further guide the user toward a desired object output.

Next, the user provides the system with a scan of the object. The system may offer the user with an option to load an image file, download or upload a design file, or scan the object into the system, to generate a model for the system to build. The system AI may provide text, LED blinking, lighting, and/or verbal/audio cues to the user so that the user may input further commands to the tools in the system to build the object.

Newly made files to produce an object(s) may be stored in the system (or stored to a remote account). The system may ask the user whether or not to use the newly made file. In response to an affirmative answer by the user, the system loads the file for use in recycling manufacturing. The system may prompt the user to input object characteristics such as color, material, density, and size. The system may extrapolate remaining dimensions that are not provided by the user.

The system may prompt the user for which process to begin (for example, additive, subtractive, coloring, etc.). The system may prompt the user to select the type of recyclable material to use including generating new grain from raw unrecycled material or using stored recycled material grain. The system may check for the safety door to be in a locked, secure position grinding recycled material into grain. The system may, according to the object file, selected manufacturing process, and meltable grain material, produce the desired object.

Other system tools such as the paint gun may be used to color the object as requested by the user specifications. A 3D/2D scanning tool head 132 (FIG. 6) may be used to make 3D copies of objects, which can then be altered, left alone, and/or made, when legal.

The system may ask the user to define parameters like density, color, material type, and longest length for a particular manufacturing file, and proportionately calculate based on a single design file dimension, the longest dimension, all of the other dimensions of the file, to scale the size of made objects up and down.

The system may also verbally ask the user for keywords, which the system looks up online, trying to find keywords associated with manufacturing file extensions or suffixes, to be able to load over 700,000 open source product design files onto the system, and/or to direct the user where and how to do the same.

During manufacturing, secondary processes may occur simultaneously. Once the object is ready and safe to handle, the system provides the user a message indicating the process is over.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for recycling a material within an apparatus to make an object in at least one of an additive and a subtractive process, comprising the steps of:

powering an apparatus, with a power supply attached to a frame, for recycling the material for reuse into the object in at least one of the additive and a subtractive process;

controlling, operating, and powering the apparatus with a central control module comprising a central processing unit or processor coupled to the power supply for receiving input commands and issuing output commands;

inputting task commands to the processor with input devices coupled to the processor, wherein the input devices comprise a touchscreen, microphone, speech recognition system or voice command system for machines, memory drive, artificial intelligence device, imaging device, wireless network, wired network, server, remote control, switch, and/or sensors, the sensors comprising proximity, motion, electromagnetic, temperature, light, pressure, humidity, and/or sound sensors;

outputting the task commands from the processor with output devices coupled to the processor, wherein the output devices comprise a touchscreen, monitor, memory drive, wireless network, wired network, server, remote control, audio speaker, light emitting diode, artificial intelligence device, voice command controller, and/or switch;

sensing the proximity, temperature, motion, pressure, light, and/or sound outside the apparatus with sensors coupled to exterior of the frame, wherein at least one of the sensors provides an input command received by the processor;

commanding the power supply with the processor, to power up the apparatus from a low power consumption hibernation state, after a proximity sensor input command is received by the processor, issuing at least one command, from the processor through one of the output devices providing a list of input commands controlling the processor and the apparatus, to recycle the material to make the object using at least one of the additive and subtractive process;

receiving at least one input request or command to control the processor and the apparatus through one of the input devices, to recycle the material to make the object using at least one of the additive and subtractive process;

issuing a task command from the processor using at least one of the output devices, for the processor to receive a task command using one of the input devices, to identify the material to be recycled;

receiving the task command to the processor using one of the input devices, for the processor to identify the material to be recycled;

issuing a task command from the processor using at least one of the output devices, to load recyclable material into the apparatus;

loading the recyclable material into the apparatus for at least one machine head system to recycle the material into the object using at least one of the additive and subtractive process;

issuing a task command from the processor using at least one of the output devices for recycling the material loaded into the apparatus, with a machine head system coupled to an energy source; and recycling the material loaded into the apparatus, with the machine head system coupled to the energy source, into the object using at least one of the additive and subtractive process.

2. The method of claim 1, further comprising a method for grinding the material loaded for use by the apparatus in a grinder module attached to the frame, comprising the steps of:

controlling the grinder module with the coupled central processing unit or processor issuing the task commands using the output devices, and receiving the task commands using the input devices;

issuing a task command from the processor using at least one of the output devices, for the processor to receive the task command using one of the input devices, to identify the material to be recycled;

receiving the task command to the processor using one of the input devices, for the processor to identify the material to be recycled;

issuing a task command from the processor using at least one of the output devices, to load the material into the grinder module through a door into a grinder module hopper chamber;

issuing a task command from the processor using at least one of the output devices, to close and lock the door to the grinder module hopper chamber, to activate grinder module motors;

receiving a task command to the processor using at least one of the input devices, such that the door to the grinder module hopper chamber is closed and locked;

issuing a task command from the processor using at least one of the output devices, to activate the grinder module motors after receiving the task command to the processor using at least one of the input devices, such that the door to the grinder module hopper chamber is closed and locked;

grinding the material to be recycled in the grinding module hopper chamber with the activated grinder module motors coupled to, at least one rotating grinder blade and/or a descending and ascending compression plate;

grinding the material into smaller pieces to be further recycled by the apparatus into the object using at least one of the additive and subtractive process;

collecting the smaller pieces of ground material, recycled by the activation of the grinder module motors, in a first container in first position below the at least one grinder blades and the grinding module hopper chamber, collected for further recycling into the object, using at least one of the additive and/or subtractive process;

issuing a task command from the processor using at least one of the output devices, to receive an input command using one of the input devices to the processor to stop the grinding module motors;

receiving a task command to the processor using one of the input devices, to stop the grinding module motors;

issuing a task command from the processor using at least one of the output devices, to load the smaller pieces of ground material, collectively known as a feed stock, building material, or grain, into the machine head system, to further be recycled into the object in at least one of the additive and/or subtractive process; and loading the smaller pieces of ground recyclable material based on the issued task command.

3. The method of claim 1, further comprising a method for washing and using the material, using a washing module coupled to the frame, comprising the steps of:

controlling the washer module with the coupled central processing unit or processor issuing task commands using the output devices, and receiving the task commands using the input devices;

controlling a pressure control valve system coupled to conduits connecting an air compressor, chambers, and at least one other conduit of the washing module;

controlling compression of air using the air compressor, conduits, and pressure control valve system, to create a negative pressure or vacuum in the conduits and chambers within the apparatus, to transport grain and/or fluid within and/or outside of the apparatus;

controlling the compression of air using the air compressor, conduits, and pressure control valve system, to create a positive pressure or blower in the conduits and chambers within the apparatus to transport grain and/or fluid within and/or outside of the apparatus;

controlling the compression of air using the air compressor, conduits, and pressure control valve system, to create a negative pressure or vacuum in the conduits and chambers within the apparatus to draw air from within the apparatus into an air filter;

controlling the compression of air using the air compressor, conduits, and pressure control valve system, to create a positive pressure or blower in the conduits and chambers within the apparatus to blow filtered air out of the air filter;

controlling the compression of air using the air compressor, conduits, and pressure control valve system, to create a negative pressure or vacuum used to vacuum out the grain collected from a first container of collected grain in first position in a grinder module attached to the frame;

controlling the compression of air using the air compressor, conduits, and pressure control valve system, to create a positive pressure or blower used to blow the grain vacuumed out of the first container of collected grain in first position into the cleaning or washing chamber;

controlling the compression of air using the air compressor, conduits, and pressure control valve system, to create a negative pressure or vacuum used to draw/vacuum one or more cleaning fluids into the cleaning chamber from outside the apparatus;

washing the grain from the grinder module in the cleaning chamber with a rotating propeller, and the one or more cleaning fluids drawn into the cleaning chamber;

controlling the compression of air using the air compressor, conduits, and pressure control valve system, to create a positive pressure or blower used to remove the one or more cleaning fluids from the cleaning chamber outside the apparatus;

drying the grain from the grinder module with blown compressed air from the air compressor, conduits, and pressure control valve system;

controlling the compression of air using the air compressor, conduits, and pressure control valve system, to create a negative pressure or vacuum used to vacuum the clean and dried grain from the washing chamber to a second container for collecting grain in second position;

controlling the compression of air using the air compressor, conduits, and pressure control valve system, to create a positive pressure or blower used to blow the vacuumed grain from the washing chamber into the second container for collecting grain in second position;

controlling the compression of air using the air compressor, conduits, and pressure control valve system, to create a positive pressure or blower in the second container for collecting grain in second position, to load the grain into the machine head system for recycling the material into an object using at least one of the additive and subtractive process; and controlling the compression of air using the air compressor, conduits, and pressure control valve system, to control the humidity and temperature of the recycling of the material by the machine head system.

4. The method of claim 1, further comprising additional methods of powering the apparatus with a renewable energy device, a renewable energy source, recaptured environmental energy generating device, a recaptured environmental energy generating device energy source, a rechargeable battery device energy source, and/or rechargeable battery device coupled to the frame, comprising the steps of:

controlling the power of the apparatus with the processor of the coupled central control module;

powering the central control module with the renewable energy device, to control the apparatus for recycling material into an object using at least one of the additive and subtractive process;

powering the central control module with the renewable energy source, to power and control the apparatus for recycling the material into the object using at least one of the additive and subtractive process;

powering the central control module with the recaptured environmental energy generating device, to power and control the apparatus for recycling the material into the object using at least one of the additive and subtractive process;

powering the central control module with the rechargeable battery device, to power and control the apparatus for recycling the material into the object using at least one of the additive and subtractive process;

powering the central control module with the rechargeable battery device energy source, to power and control the apparatus for recycling the material into the object using at least one of the additive and subtractive process; and/or powering the central control module with the recaptured environmental energy generating device energy source, to power and control the apparatus for recycling the material into the object using at least one of the additive and subtractive process, comprising:

powering the central control module with an environmental energy generator recapturing pressure energy derived from one or more operations of the apparatus;

powering the central control module with an environmental energy generator recapturing vibrational energy derived from one or more operations of the apparatus;

powering the central control module with an environmental energy generator recapturing thermal, heat, or electromagnetic energy derived from one or more operations of the apparatus; and/or powering the central control module with an environmental energy generator recapturing rotary or rotational energy derived from one or more operations of the apparatus.

5. The method of claim 1, further comprising a method for coloring material recycled by the apparatus using a third machine head, comprising the steps of:

coupling the replaceable third machine head to the machine head system;

loading the replaceable third machine head with colorant, paint, and/or dye;

controlling the third machine head, for coloring the material recycled by the apparatus in at least one of the additive and subtractive process, with the coupled processor of the central control module;

controlling the compression of air using the air compressor, conduits, and pressure control valve system, with the processor, to create a positive pressure or blower used to blow compressed air to the third machine head; and blowing colorant from the third machine head onto the material recycled by the apparatus.

6. The method of claim 1, further comprising a method for imaging or scanning three dimensions with a fourth machine head coupled to the machine head system for imaging or scanning in the three dimensions, comprising the steps of:

coupling the replaceable fourth machine head to the machine head system;

controlling the fourth machine head, for imaging or three dimensional scanning by the apparatus for recycling the material into the object in at least one of the additive and subtractive process, with the coupled processor of the central control module; and imaging or scanning in the three dimensions, to provide an input command to the processor, to recycle the material into the object in at least one of the additive and subtractive process.

7. The method of claim 1, further comprising a method for exchanging machine head tools coupled to the machine head system, comprising the steps of:

controlling the machine head tool exchange system, with the coupled processor of the central control module;

coupling the machine head system to at least one of the machine head tools stored in a machine head storage rack for use by the apparatus in recycling the material into the object in at least one of the additive and subtractive process; and uncoupling the machine head system to at least one of the machine head tools coupled to the machine head system, over the machine head storage rack, for storing unused machine head tools.

8. The method of claim 1, further comprising a method for monitoring and/or correcting the recycling of the material into the object using an infrared camera or imaging system, comprising the steps of:

controlling the infrared camera or imaging system, with the coupled processor of the central control module;

scanning or imaging the recycling of the material into the object in at least one of the additive and subtractive process;

identifying errors in the recycling of the material into the object in at least one of the additive and subtractive process; and issuing at least one command to and/or from the processor of the central control module to address and/or correct at least one error in the recycling of the material into the object in at least one of the additive and subtractive process.

9. An apparatus for recycling material into an object using at least one of an additive and a subtractive process, comprising:

a frame to make attachments to the apparatus;

an electrical power supply connected to the frame for powering the apparatus, comprising:

a power supply unit to obtain power from an electrical outlet;
a controller module or user interface coupled to the frame and the electrical power supply, for powering, controlling, and operating the apparatus and electrical processes associated with the apparatus, comprising:
   a central processing unit configured to:
      receive task commands inputs as a request for producing an additive manufacturing based object and/or a subtractive manufacturing based object, in a recycling process; and
      issue task commands outputs to manufacture the requested additive manufacturing based object and/or the subtractive manufacturing based object, in the recycling process;
an output device coupled to the central processing unit, for issuing the task commands, comprising a touchscreen, monitor, memory drive, at least one motor, wireless network, wired network, server, remote control, audio speaker, light emitting diode, artificial intelligence device, and/or at least one switch;
an input device coupled to the central processing unit, for receiving the task commands, comprising a touchscreen, microphone, speech recognition system or voice command system for machines, at least one switch, memory drive, imaging device, 3D scanner, artificial intelligence device, wireless network, wired network, server, remote control, and/or sensors, wherein
   the sensors comprise proximity, motion, electromagnetic, temperature, light, pressure, humidity, and/or sound sensors, and
   the sensors are configured to issue a command to the electrical power supply to increase power to the apparatus from a low power consumption hibernation state;
a machine head system coupled to the frame and movable within an interior volume of the frame, the machine head system comprising:
   a first machine head with a replaceable clamped tool configured to perform recycling using additive manufacturing processes; and/or
   a second machine head with a replaceable clamped tool configured to perform recycling using a subtractive manufacturing processes;
a motor control system coupled to and for controlling the machine head system;
a control system coupled to and for controlling operations of the motor control system, which is coupled to the central processing unit of the controller module;
an energy source coupled to the machine head system to recycle meltable recyclable materials into an object, wherein the recycling materials are loaded into the apparatus using at least one of the additive and/or subtractive process; and
a control system coupled to and for controlling operations of the energy source couple to the machine head system, wherein the control system is coupled to the central processing unit of the controller module.

10. The apparatus of claim 9, further comprising a grinder module, which is coupled to the frame, comprising:
a hopper chamber for receiving recyclable or other meltable material;
a motorized grinder coupled within the narrowed or bottom outlet of the hopper chamber for grinding the received recyclable or other meltable material into a material for manufacturing or grain;
a control system coupled to the central processing unit for controlling operations of the motorized grinder;
a first container in first position disposed to collect the grain from the motorized grinder;
a descending and ascending grinder motorized compression plate coupled to the hopper chamber ceiling for compressing meltable material into the motorized grinder;
a control system coupled to the central processing unit for controlling operations of the motorized grinder compression plate;
a door coupled to the frame leading to the hopper chamber;
a door sensor and safety lock/switch coupled to the door, for:
   switching off grinder module motor control systems for an open or unlocked door; and
   switching on the grinder module motor control systems for a closed and locked door;
a control system coupled to the central processing unit for controlling operations of the door sensor and safety/lock switch; and
a control system coupled to the central processing unit for controlling operations of the grinder module.

11. The apparatus of claim 9, further comprising a wash module, which is coupled to the frame and the first container of collected grain in first position, comprising:
a cleaning or washing chamber, for cleaning, drying, sorting, and storing grain;
a second container of collected cleaned grain in second position;
a first conduit that is bifurcated connected between the cleaning chamber and the first container of collected grain in first position;
a second conduit that connects to the bifurcated first conduit;
a third conduit that connects to the second conduit and the second container of collected cleaned grain in second position;
a fourth conduit that connects the second container for collecting cleaned grain in second position to the first machine head;
a carbon filtration system coupled to the frame to reduce or prevent emissions from the recycling process including the subtractive and additive manufacturing processes;
a control system coupled to the central processing unit for controlling operations of the carbon filtration system;
an air compressor-vacuum system coupled to the frame, configured to vacuum the grain from the first container of collected grain in first position into the cleaning chamber, using the second conduit and the first conduit;
a control system coupled to the central processing unit for controlling operations of the air compressor-vacuum system;
a pressure control valve system, comprising at least two air pressure control valves for each conduit section, to be able to pressurize each conduit section from the first conduit, the second conduit, the third conduit, and the fourth conduit, pressurized by the air compressor-vacuum system, all coupled to the central processing unit, to increase and decrease pressure in each conduit section, collectively configured to:
   transport grain and air from the first container for collecting grain in first position to the cleaning chamber;

transport air from the air compressor-vacuum system to the cleaning chamber to dry the grain that has been washed;
transport grain that has been dried to the second container collecting cleaned grain in second position;
transport grain from the second container collecting cleaned grain to the first machine head;
pump cleaning fluid into and out of the cleaning chamber via cleaning fluid input and output valves by increasing and decreasing pressure in the washing chamber, drawing in and pushing out cleaning fluid;
vacuum emissions that result from the recycling process including the subtractive and additive manufacturing processes through a carbon filter;
pump emissions out of the apparatus that have been passed through a carbon filter; and/or
control humidity and temperature in a space shared by a motorized and moving building deck and each of the first machine head and the second machine head by pumping compressed air into the apparatus;
a control system coupled to the central processing unit for controlling operations of the pressure control valve system;
a motorized and waterproof washing and drying propeller coupled to the cleaning chamber, to aid in the washing and drying of the grain;
a control system coupled to the central processing unit for controlling operations of the motorized propeller;
a controller coupled to the air compressor-vacuum and the pressure control valves to control and operate increment and decrement in pressure in each of the first conduit, the second conduit, the third conduit, and the fourth conduit; and
a control system coupled to the central processing unit for controlling operations of the wash module.

12. The apparatus of claim 9, further comprising one or more alternative power sources, which are coupled to the frame, comprising:
a renewable energy power supply configured to derive power from renewable energy devices;
an environmental energy recapture system or internal power supply generator, comprising:
an environmental energy generator for recapturing pressure energy;
an environmental energy generator for recapturing thermal/heat energy;
an environmental energy generator for recapturing vibration energy;
an environmental energy generator for recapturing rotational energy; and/or
an environmental energy generator for recapturing electromagnetic energy;
a rechargeable battery power supply, for use of the apparatus, to acquire, store, and/or distribute power to the central processing unit to control operations in the apparatus and a battery, wherein a source of power of the battery comprises:
an electrical outlet,
a renewable energy generator, and/or
an environmental energy recapture system; and/or
a power regulation system coupled to the central processing unit for detecting energy inputs and/or outputs within the apparatus for increasing and/or decreasing power of the apparatus.

13. The apparatus of claim 9, further comprising a third machine head coupled to the machine head system for coloring the material recycled by the apparatus, comprising:
a third machine head, as a paint/dye dispensing device, to color the material recycled by the apparatus, coupled to the machine head system and a conduit of a set of conduits; and
a control system coupled to the third machine head, the central processing unit of the controller module, air compressor, each conduit of the set of conduits, and pressure control valve system, to control the third machine head dispensing colorant, paint, and/or dye onto the material recycled by the apparatus into the object by at least one of the additive and subtractive process.

14. The apparatus of claim 9, further comprising a fourth machine head coupled to the machine head system for imaging or three dimensional scanning, comprising:
a fourth machine head, as an imaging device or three dimensional scanner, coupled to the machine head system, for use in recycling the material into the object using at least one of the additive and subtractive process; and
a control system coupled to the fourth machine head, and to the central processing unit of the controller module, to control the fourth machine head to perform the imaging or three dimensional scanning processes, for use in recycling the material into the object using at least one of the additive and subtractive process.

15. The apparatus of claim 9, further comprising a machine head tool exchange system coupled to the apparatus, further comprising:
a storage rack for machine head tools that are unused by the apparatus;
a coupling or clamping system for coupling and uncoupling the machine head tools to the machine head system for machine head tool replacement or exchange; and
a control system coupled to the central processing unit for controlling the machine head system, to couple at least one of the machine head tools stored in the storage rack to the machine head system for use in recycling the material into the object in at least one of the additive and subtractive process, and to uncouple at least one of the first machine head or the second machine head from the machine head system over the storage rack for storage.

16. The apparatus of claim 9, further comprising:
an infrared camera or imaging device coupled to the frame, for monitoring and/or correcting the recycling of the material into an object in at least one of the additive and subtractive process; and
a control system coupled to the central processing unit for controlling the infrared or imaging system.

* * * * *